United States Patent
Klockhaus et al.

(10) Patent No.: US 6,501,044 B1
(45) Date of Patent: Dec. 31, 2002

(54) METHOD FOR WELDING THE SURFACES OF MATERIALS

(75) Inventors: Matthias Klockhaus, Gelsenkirchen (DE); Dieter Jestel, Castrop-Rauxel (DE)

(73) Assignee: Institut fur Angewandte Photovoltaik GmbH, Gelsenkirchen (DE)

( * ) Notice: Subject to any disclaimer, the term of this patent is extended or adjusted under 35 U.S.C. 154(b) by 59 days.

(21) Appl. No.: 09/693,814

(22) Filed: Oct. 23, 2000

(51) Int. Cl.⁷ ............................................. B23K 26/20

(52) U.S. Cl. ................................................ 219/121.64

(58) Field of Search ................. 219/121.63, 121.64, 219/121.65, 121.66; 65/43, 59.1

(56) References Cited

U.S. PATENT DOCUMENTS

| | | | |
|---|---|---|---|
| 3,217,088 A | * 11/1965 | Steierman | 219/121.64 |
| 5,176,788 A | * 1/1993 | Kabacoff et al. | 156/603 |
| 5,489,321 A | 2/1996 | Tracy et al. | |

FOREIGN PATENT DOCUMENTS

JP 401225140 * 9/1989 ............ 219/121.64

* cited by examiner

Primary Examiner—Samuel M. Heinrich
(74) Attorney, Agent, or Firm—Patton Boggs LLP

(57) ABSTRACT

A method for welding the surfaces of materials, of which at least one is glass, during which the energy that is required for the welding process is provided by with a laser beam, characterized by the fact that an intermediate sealing glass is applied between the surfaces that are to be welded and that the laser beam is adjusted in such a way that only the intermediate sealing glass melts.

4 Claims, 1 Drawing Sheet

METHOD FOR WELDING THE SURFACES OF MATERIALS

BACKGROUND OF THE INVENTION

The invention relates to a method for welding the surfaces of materials, of which at least one is glass, during which the energy that is required for the welding process is supplied by a laser beam.

Due to the specific properties of glass, it was required until now that glass which was to be bonded with another piece of glass or metal through fused mass had to be heated beyond the transformation point of the glass. In part it was also required to heat the areas that were to be fused together additionally, e.g. with flames. Subsequent to the welding process, the glass must cool down slowly to room temperature while avoiding stress, which could lead to breakage.

An example of the method of the kind described above is in U.S. Pat. No. 5,489,321, which shows radiation-absorbent material, e.g. a metal or a suitable oxide, is placed between glass panes in those areas in which the glass is to be welded together. Iron oxide, vanadium oxide or nickel oxide have proven to be particularly preferred radiation absorbent materials because the metal ions achieve their radiation absorption maximum around the emission wavelength of the Nd:YAG laser utilized in that example. The laser energy fed melts the glass of the glass panes due to thermal conduction through the metal or oxide, with the glass current of both panes becoming blended. This is also followed by the cooling process described above.

SUMMARY OF THE INVENTION

An objective of the invention is to provide a method for welding the surfaces of materials, of which at least one is glass, during which the cooling process no longer has to be monitored and controlled through readjustment.

These and other objectives are obtained by the invented method in which a laser beam is used and an intermediate sealing glass is applied between the surfaces that are to be welded together, and that the laser beam is adjusted in such a way that only the intermediate sealing glass is melted.

DETAILED DESCRIPTION OF THE INVENTION

Figure 1:
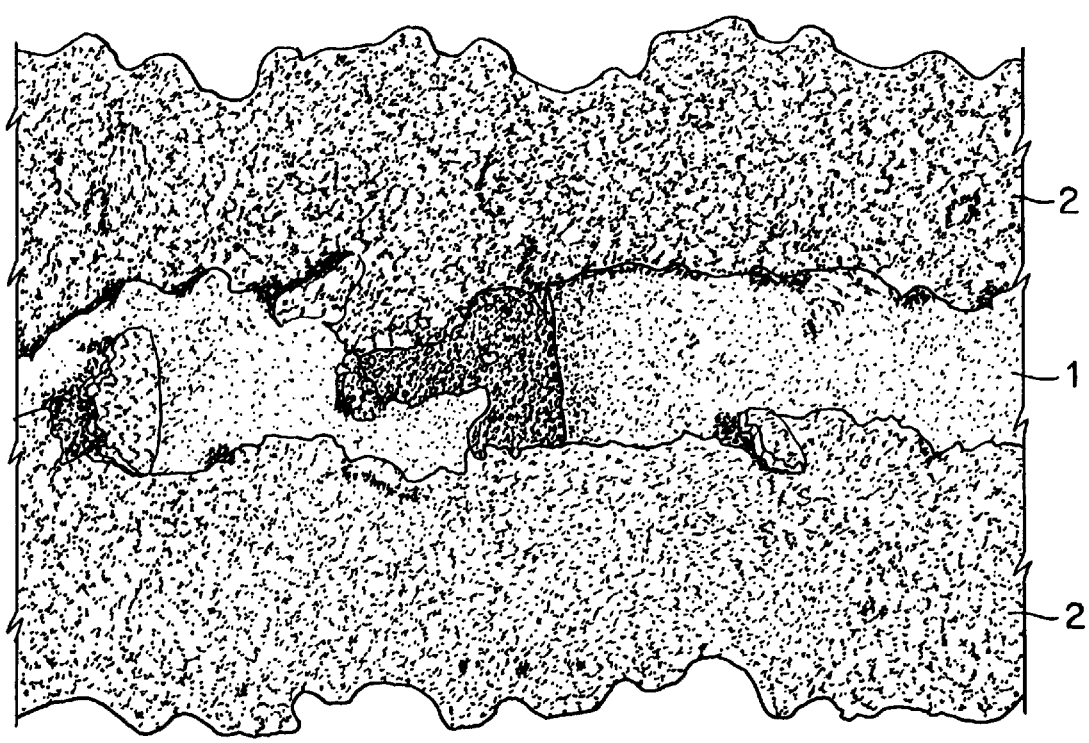
FIG. 1 is a photomicrographic image of a weld in accordance with the present invention.

The intermediate sealing glass 2 is represented by fusible glass with low viscosity and low surface tension at sealing temperatures between 300–450° C. (572–842° F.). Glass with a melting point of 450° C. (842° F.), for example, has the following composition:

70–92% PbO
2–15% (ZnO, SrO)
0.6–15% $B_2O_3$
0–15% ($SiO_2$, $Al_2O_3$, $TiO_2$)

FIG. 1 is a photomicrographic image of the surface of a weld seam formed according to the method of this invention, after being broken up.

The width of the micrographic image of FIG. 1 corresponds to about 0.5 mm (0.02 inch). The track 1 of the laser beam runs through the silver intermediate sealing glass 2. When breaking up the weld joint, the welded material from track 1 was pulled from the background, which can be seen by the step from track 1 to the silver sealing 2 in picture 1 so that one can assume that an intimate connection had existed with the appropriate surface which it was only possible to destroy when applying considerable force.

Based on a specific version of the method, an argental intermediate sealing glass is utilized.

It is also preferred to stamp the intermediate sealing glass onto at least one of the surfaces (not numbered) that are to be welded together. Additionally, the method provides for the sealing layer to be sinter-fused in order to achieve better adhesion to the surface.

It is useful to mix addition agents to the intermediate sealing glass so that the absorption for the wavelength of the laser light can achieve its maximum The material of the second surface can be glass or metal.

In the invented welding process of glass, the intermediate sealing glass, which generally has the form of a paste, is applied between the surfaces that are to be sealed and is then heated with a laser so as to create a glass flow in the intermediate sealing glass. Due to the additives contained in the intermediate sealing glass, the intermediate sealing glass is melted on under the laser beam and the intermediate sealing glass in turn reacts with the contact surfaces in such a way that a permanent connection is created between the surfaces that are to be welded once it solidifies. A cooling phase, which has to be monitored, can be eliminated. After the laser welding process, the welded glass can be used immediately.

The application of the invented method does not require the laser beam to hit the intermediate sealing glass directly. It can rather be guided through at least one of the glass layers that are to be connected.

Laser energy, wavelength, duration of the laser's influence, absorption properties of the intermediate sealing glass as well as transmission of the glass that is to be welded are all adjusted to each other in such a way that an optimal welding process is made possible.

The features of the invention disclosed in the description above, in the drawing as well as in the claims, can be important for the realization of the invention both individually and in any random combination.

What is claimed is:

1. A method for welding materials, comprising providing a first object having a first surface;

providing a second object having a second surface;

arranging an argental intermediate sealing glass on at least a portion of at least one of said first surface and said second surface;

arranging said first object on said second object such that said at least a portion of at least one of said first surface and said second surface faces at least a portion of the other of said first surface and said second surface and said argental intermediate sealing glass is between said at least a portion of said first surface and a portion of said second surface;

heating at least a portion of said argental intermediate sealing glass to its melting point using a laser beam, wherein the laser beam is adjusted such that only the argental intermediate sealing glass is melted, and the first surface is glass.

2. A method in accordance with claim 1 wherein the intermediate sealing glass is printed onto said at least a portion of at least one of said first surface and said second surface.

3. A method in accordance with claim 1 wherein the material of the second surface is glass or metal.

4. A method in accordance with claim 2 wherein the material of the second surface is glass or metal.

* * * * *